United States Patent [19]

Boutni et al.

[11] Patent Number: 5,605,980
[45] Date of Patent: Feb. 25, 1997

[54] COPOLYESTERCARBONATE AND POLYCARBONATE

[75] Inventors: Omar M. Boutni, Mt. Vernon; Luca P. Fontana; Sarah E. Morgan, both of Evansville, all of Ind.

[73] Assignee: General Electric Company, Pittsfield, Mass.

[21] Appl. No.: 601,883

[22] Filed: Feb. 15, 1996

Related U.S. Application Data

[63] Continuation of Ser. No. 254,468, Jun. 6, 1994, abandoned, which is a continuation of Ser. No. 7,403, Jan. 21, 1993, abandoned, which is a continuation of Ser. No. 681,302, Apr. 8, 1991, abandoned.

[51] Int. Cl.$^6$ .............. C08L 69/00; C08L 67/02
[52] U.S. Cl. ........................ 525/439; 525/462
[58] Field of Search ................... 525/439, 462

[56] References Cited

U.S. PATENT DOCUMENTS

| 3,166,606 | 1/1965 | Reinking | 525/439 |
|---|---|---|---|
| 4,286,083 | 8/1981 | Kochanowski | 525/439 |
| 4,436,879 | 3/1984 | Miller | 525/439 |
| 4,504,634 | 3/1985 | Miller | 525/439 |
| 4,559,388 | 12/1985 | Liu et al. | 525/146 |
| 4,983,706 | 1/1991 | Fontana | 528/176 |
| 5,025,056 | 6/1991 | Jorissen et al. | 524/310 |
| 5,025,081 | 6/1991 | Fontana | 525/176 |
| 5,116,905 | 5/1992 | Belfoure | 525/439 |
| 5,187,242 | 2/1993 | Sakashita | 525/439 |

FOREIGN PATENT DOCUMENTS

| 0065728 | 5/1992 | European Pat. Off. . |
|---|---|---|
| WO91/09896 | 7/1991 | WIPO . |

Primary Examiner—David Buttner

[57] ABSTRACT

A composition comprising
 a. about 10 to 90 weight-percent of an aromatic polycarbonate in admixture with
 b. about 90 to 10 weight percent of copolyestercarbonate having repeating units of the structure

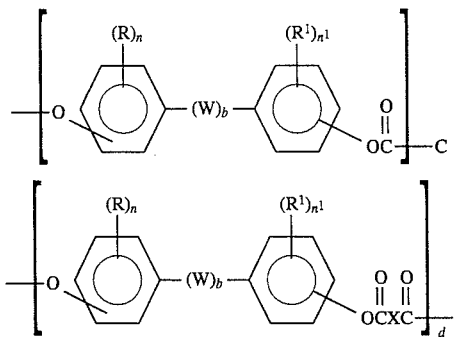

wherein:
 R is independently selected from halogen, monovalent hydrocarbon, and monovalent hydrocarbonoxy radicals;
 $R^1$ is independently selected from halogen, monovalent hydrocarbon, and monovalent hydrocarbonoxy radicals;
 W is selected from divalent hydrocarbon

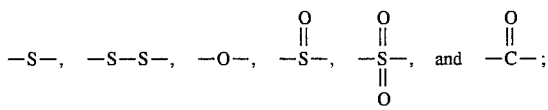

radicals,
 n and $n^1$ are independently selected from integers having a value of from 0 to 4 inclusive;
 b is either zero or one;
 X is an alkylene group of about 6 to 18 carbon atoms, inclusive;
 d is from about 2 to 30 mole percent of the total units c+d; and
 a and b calculated as weight percent of a plus b.

14 Claims, No Drawings

COPOLYESTERCARBONATE AND POLYCARBONATE

This is a continuation of Ser. No. 08/254,468 filed on Jun. 6, 1994 now abandoned which is a continuation of Ser. No. 08/007,403 filed on Jan. 21, 1993 now abandoned which is a continuation of Ser. No. 07/681,302 filed on Apr. 8, 1991 now abandoned.

BACKGROUND OF THE INVENTION

Polycarbonates are well known amorphous polymers known for their transparency, toughness, and impact resistance. Copolyestercarbonates are also well known. These polymers having both ester and carbonate linkages of the properties which are similar to polycarbonates. A new copolyestercarbonate has been described in Ser. No. 07/627,517 filed Dec. 14, 1990, Ser. No. 07/476,068 filed Jan. 30, 1990 and Ser. No. 07/455,118 filed Dec. 22, 1989. This copolyestercarbonate has aromatic carbonate units and aromatic aliphatic ester units wherein the aromatic unit is a dihydric phenol and the ester unit is an aliphatic alpha omega dicarboxylic acid. This substantially differs from the totally aromatic copolyestercarbonates which are well known from the prior art particularly U.S. Pat. No. 4,522,980 and other relevant patents. As is observed from the data on the copolyestercarbonate of this invention it has the advantage of better flow and processability at a lower temperature than an ordinary aromatic polycarbonate of the same intrinsic viscosity. However heat related properties of the copolyestercarbonates such as DTUL are lowered. It has now been found that by blending aromatic polycarbonate with the copolyestercarbonate disclosed herein over a specific weight percent range, certain physical properties change over the range while other properties demonstrate very little if any change over the range.

SUMMARY OF THE INVENTION

In accordance with the invention there is an admixture comprising from about 10–90 weight percent of a copolyestercarbonate having the repeating units of the structure:

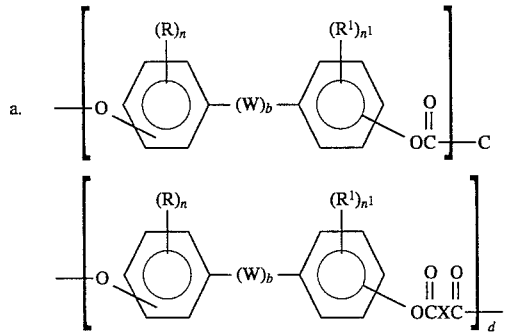

wherein:

R is independently selected from halogen, monovalent hydrocarbon, and monovalent hydrocarbonoxy radicals;

$R^1$ is independently selected from halogen, monovalent, hydrocarbon, and monovalent hydrocarbonoxy radicals;

W is selected from divalent hydrocarbon radicals,

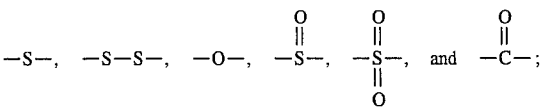

$n$ and $n^1$ are independently selected from integers having a value of from 0 to 4 inclusive;

b is either zero of one;

X is an alkylene group of about 6 to 18 carbon atoms, inclusive;

d is from about 2 to 30 mole percent of the total units c+d; and (b) about 90–10 weight percent of an aromatic polycarbonate

DETAILED DESCRIPTION OF THE INVENTION

Dihydric phenols which are useful in preparing the copolyestercarbonate of the invention may be represented by the general formula

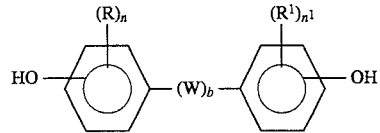

wherein:

R is independently selected from halogen, monovalent hydrocarbon, and monovalent hydrocarbonoxy radicals;

$R^1$ is independently selected from halogen, monovalent hydrocarbon, and monovalent hydrocarbonoxy radicals;

W is selected from divalent hydrocarbon radicals,

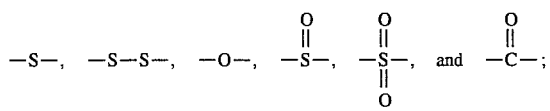

$n$ and $n^1$ are independently selected from integers having a value of from 0 to 4 inclusive; and b is either zero or one.

The monovalent hydrocarbon radicals represented by R and $R^1$ include the alkyl, cycloalkyl, aryl, aralkyl and alkaryl radicals. The preferred alkyl radicals are those containing from 1 to about 12 carbon atoms. The preferred cycloalkyl radicals are those containing from 4 to about 8 ring carbon atoms. The preferred aryl radicals are those containing from 6 to 12 ring carbon atoms, i.e., phenyl, naphthyl, and biphenyl. The preferred alkaryl and aralkyl radicals are those containing from 7 to about 14 carbon atoms.

The preferred halogen radicals represented by R and $R^1$ are chlorine and bromine.

The divalent hydrocarbon radicals represented by W include the alkylene, alkylidene, cycloalkylene and cycloalkylidene radicals. The preferred alkylene radicals are those containing from 2 to about 30 carbon atoms. The preferred alkylidene radicals are those containing from 1 to about 30 carbon atoms. The preferred cycloalkylene and cycloalkylidene radicals are those containing from 6 to about 16 ring carbon atoms.

The monovalent hydrocarbonoxy radicals represented by R and $R^1$ may be represented by the formula $-OR^2$ wherein $R^2$ is a monovalent hydrocarbon radical of the type described hereinafore. Preferred monovalent hydrocarbonoxy radicals are the alkoxy and aryloxy radicals.

Some illustrative non-limiting examples of the dihydric phenols falling within the scope of Formula II include:

2,2-bis(4-hydroxyphenyl)propane (bisphenol-A);
2,2-bis(3,5-dibromo-4-hydroxyphenyl)propane;
2,2-bis(3,5-dimethyl-4-hydroxyphenyl)propane;
1,1-bis(4-hydroxyphenyl)cyclohexane;
1,1-bis(3,5-dimethyl-4-hydroxyphenyl)cyclohexane;
1,1-bis(4-hydroxyphenyl)decane;
1,4-bis(4-hydroxyphenyl)propane;
1,1-bis(4-hydroxyphenyl)cyclododecane;
1,1-bis(3,5-dimethyl-4-hydroxyphenyl)cyclododecane;
4,4-dihydroxydiphenyl ether;
4,4-thiodiphenol;
4,4-dihydroxy-3,3-dichlorodiphenyl ether; and
4,4-dihydroxy-2,5-dihydroxydiphenyl ether.

Other useful dihydric phenols which are also suitable for use in the preparation of the above polycarbonates are disclosed in U.S. Pat. Nos. 2,999,835; 3,028,365; 3,334,154; and 4,131,575, all of which are incorporated herein by reference.

The carbonate precursor utilized in the invention can be any of the standard carbonate precursors such as phosgene, diphenyl carbonate and the like. When using an interfacial process or a bischloroformate process it is also preferred to use a standard catalyst system well known in the synthesis of polycarbonates and copolyestercarbonates. A typical catalyst system is that of an amine system such as tertiaryamine, amidine or guanidine. Tertiary amines are generally employed in such reactions. Trialkylamines such as triethylamine are generally preferred.

The monomer which supplies the ester units in the copolyestercarbonate is an aliphatic alpha omega dicarboxylic acid or ester precursor from 8 to about 20 carbon atoms preferably 10 to 12 carbon atoms. The aliphatic system is normal, branched or cyclic. Examples of the system include azelaic acid, sebacic acid, dodecanedioic acid, C14, C18 and C20 diacids. The normal saturated aliphatic alpha omega dicarboxylic acids are preferred. Sebacic, and dodecanedioic acid are most preferred. Mixtures of the diacids can also be employed. It should be noted that although referred to as diacids, any ester precursor can be employed such as acid halides, preferably acid chloride, diaromatic ester of the diacid such as diphenyl, for example the diphenylester of sebacic acid. With reference to the carbon atom number earlier mentioned, this does not include any carbon atoms which may be included in the ester precursor portion, for example diphenyl.

The copolyestercarbonates of the invention can be prepared by the known methods, for example those appearing in Quinn U.S. Pat. No. 4,238,596 and Quinn and Markezich U.S. Pat. No. 4,238,597. Examples of such processes include the formation of acid halides prior to the reaction of the ester forming group with the dihydric phenol and then followed by phosgenation. Still further, the basic solution process of Goldberg in the U.S. Pat. No. 3,169,121 reference utilizing a pyridine solvent can also be employed while also using the dicarboxylic acid per se. A melt process utilizing the diesters of the alpha omega dicarboxylic acids can also be employed. An example of such a compound is the diphenylester of sebacic acid.

After substantial experimentation, it has been found that a preferred process for making the copolyestercarbonates of this invention exists. The process of Kochanowski, U.S. Pat. No. 4,286,083 (083) was initially utilized and then improved upon. It was found that lower diacids such as adipic acid were not incorporated into the polymer backbone to any great extent. Rather, one had to go up to higher carbon atom dicarboxylic acids before any significant incorporation of diacid into the backbone was observed. We have found that the diacid is preferentially introduced as the preformed salt, preferably an alkali metal such as sodium into the interfacial reaction reactor. The water phase is maintained at an alkaline pH preferably from about 8 to 9 for most of the phosgenation period and then raising the pH to a level of about 10 to 11 for the remainder of the phosgenation time period which is generally a minimum of 5%.

In order to control molecular weight, it is standard practice to utilize a chain stopping agent which is a monofunctional compound. This compound when reacting with the appropriate monomer provides a non-reactive end. Therefore the quantity of chain stopping compound controls the molecular weight of the polymer. Bulkier chain terminators than phenol should provide substantially better retention of physical properties such as impact. Examples of these bulkier substituents include paratertiarybutylphenol, isononyl phenol, isooctyl phenol, cumyl phenols such as meta and paracumyl phenol, preferably paracumyl phenol, as well as chromanyl compounds such as Chroman I.

The copolyestercarbonate of this invention with the standard endcapping reagent possesses a substantially lowered glass transition temperature, Tg, therefore providing processability at a lower temperature. Surprisingly accompanying this low temperature processability are substantially equivalent physical properties as a standard polycarbonate of the same intrinsic viscosity as the inventive composition and very high flow rates.

The aliphatic alpha omega dicarboxylic acid ester is present in the copolyestercarbonate in quantities from about 2 to 30 mole percent, based on the dihydric phenol. Generally with quantities below about 2 mole percent the Tg is insufficiently lowered and significantly altered flow rate is not observed. Above about 30 mole percent, the physical properties of the copolyestercarbonate are significantly hindered in comparison to the polycarbonate without the aliphatic ester linkages. Preferred mole percents of aliphatic alpha omega dicarboxylic acid ester are from about 5 to 25 and more preferably about 7 to 20 mole percent of the dihydric phenol.

The weight average molecular weight of the copolyestercarbonate can generally vary from about 10,000 to about 100,000 as measured by GPC, using a polystyrene standard corrected for polycarbonate. A preferred weight average molecular weight is from about 16,000 to about 40,000.

The copolyestercarbonate has the following structural units.

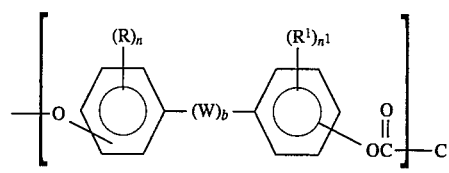

FIG. 2

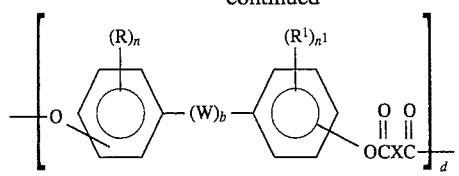

where R, $R^1$, n, $n^1$, W and b have been previously, described and X is an alkylene grouping of about 6 to about 18 carbon atoms, inclusive. The d repeating unit is present in the copolyestercarbonate in from about 2 to 30 mole percent of the total of the repeating units c+d, X is preferably about 8 to 16 carbon atoms, inclusive. The alkylene system is preferably saturated and is normal, branched, cyclic or alkyl substituted cyclic. The mole percent of d is preferably about 5 to 25 and more preferably about 7 to 20 mole percent. For example, when 5 moles of bisphenol-A reacts completely with 4 moles of phosgene and 1 mole of dodecanedioic acid, the resulting copolyestercarbonate is said to have 20 mole percent ester content. That is, the d unit is 20 mole percent of the c+d units.

Of course the aromatic polycarbonates which are utilized in the invention are those which are used in the standard manner and which can be readily prepared from dihydric phenol and carbonate precursor. The previous dihydric phenols which can be employed for the copolyestercarbonate of course the same type of dihydric phenols which can be used for the aromatic polycarbonate. In like manner the carbonate precursors which can be utilized for the copolyestercarbonate may be also used for the polycarbonate.

The aromatic polycarbonate can vary from about 10 to 90 weight percent of the total aromatic polycarbonate and copolyestercarbonates while the copolyestercarbonate is from about 90 to 10 weight percent of the two. It is preferred to use about 20 to 80 weight percent of the copolyestercarbonate in conjunction with 80 to 20 weight percent of the polycarbonate. It is also preferred to have the composition components endcapped with large, bulky endcapping agents such as cumylphenol, isooctylphenol, isononyl phenol or a chroman. Preferably the polycarbonate copolyestercarbonate composition is essentially absent or completely free from polyester, rubbery materials such as acrylonitrile butadiene styrene or methylmethacrylate butadiene styrene materials or mixtures of the polyester and rubbery materials as well as from other impact modifiers known as useful in polycarbonate, for example polyolefins and the like. Although various mixtures of the copolyestercarbonate and polycarbonate can be employed, it is preferred to employ a mixture wherein there is a significant difference in the molecular weight of the two resins. Generally with reference to intrinsic viscosity units of dl/g measured at 25° C. in methylene chloride, a difference of about 0.04 I.V. units, or greater, preferably 0.06 I.V. units or greater is significant. For example, a resin with an intrinsic viscosity (I.V.) of about 0.52–0.57 dl/g is combined with a resin with an I.V. of about 0.42–0.47 dl/g, I.V. measured in methylene chloride at 25° C. Either resin can be the higher I.V., however the copolyestercarbonate is preferred. When resins are of similar I.V., most properties remain essentially constant while other property(ies) can vary substantially. The I.V. referred to above is measured on the powder.

The compositions can be blended in the usual manner and processed in the usual manner.

Below are examples of the invention. These examples are meant to exemplify the invention and are not intended to narrow the examples.

In the examples below, the polycarbonate of the invention was prepared by standard means and is bisphenol-A polycarbonate. The copolyestercarbonate is a 10 mole % dodecanedioate ester content bisphenol-A copolyestercarbonate. In Example 1 the polycarbonate is endcapped with phenol. In Example 2, the polycarbonate and in Examples 1 and 2 the copolyestercarbonate is endcapped with paracumylphenol.

Abbreviations used in the Table have the following meanings:

TABLE I

MVI—melt Viscosity Index measured at 280° C. and 12 Newtons.

s.d.—standard deviation

T.S.—tensile strength

INI—Impact Notched Izod as measured by ASTMD256

Vicat-50N, 120° C. per hour

DTUL—measured at 1.82 MPa, ASTM D648

DSC Tg—glass transition temperature

BI—Biaxial Instrumented Impact, ASTM D3763 3.2 mm thickness ×101.6 mm diameter; 12.77 mm Tup PB—Partial Break

TABLE II

MF—melt flow—ASTM D1238, condition O

DTUL264—at 1.82 MPa, ASTM D648

TY—tensile yield, units MPa per ASTM D638

TE—tensile elongation, %

TB—tensile break, MPa, ASTM D638

6.4 mm NI—6.4 mm Notched Izod, J/M ASTM D256

1.8 mm NI—1.8 mm Notched Izod, J/M ASTM D256

BI—Biaxial Instrumented Impact, ASTM D3763 3.2 mm thickness ×101.6 mm diameter; 12.77 mm Tup YI—yellowness index in accordance with ASTM D1925-70%T—percent transmission in accordance with ASTM D1925-70%H—percent haze

EXAMPLE 1

In Example 1 the polycarbonate and copolyestercarbonate were extruded at 500° F. and molded with parts at 570° F.

TABLE I

| PROPERTY | UNIT | PC 100 PEC 0 | 75 25 | 50 50 | 25 75 | 0 100 |
| --- | --- | --- | --- | --- | --- | --- |
| I.V. powder | dl/g | 0.526 | | | | 0.522 |
| I.V. granules | dl/g | 0.527 | | | | 0.494 |
| I.V. part | dl/g | 0.526 | | | | 0.484 |
| MVI 280 C/12N | cc/10 min | 5.7 | 8.7 | 12.5 | 18 | 22.7 |

TABLE I-continued

| PROPERTY | UNIT | PC 100 PEC 0 | 75 25 | 50 50 | 25 75 | 0 100 |
|---|---|---|---|---|---|---|
| T.S. yield | N/mm2 | 64.5 | 63.8 | 62.4 | 60.8 | 59.2 |
| | s.d. | 0.3 | 0.1 | 0.1 | 0.1 | 0.1 |
| Elong at break | % | 145 | 148 | 156 | 162 | 148 |
| | s.d. | 15 | 10 | 6 | 4 | 20 |
| INI RT | J/m | 784 | 724 | 730 | 701 | 719 |
| | s.d. | 21 | 21 | 15 | 7 | 15 |
| | | 5PB | 5PB | 5PB | 5PB | 5PB |
| INI 0 C. | J/m | 721 | 559 | 652 | 671 | 555 |
| | s.d. | 18 | 240 | 36 | 56 | 308 |
| | | 5PB | 4PB/1° C. | 4PB | 4PB | 4PB/1° C. |
| INI −10 C. | J/m | 464 | 355 | 237 | 426 | 542 |
| | s.d. | 262 | 292 | 219 | 280 | 216 |
| | | 3PB/2C | 2PB/3C | 1PB/4C | 3PB/2C | 4PB/1C |
| INI −20 C. | J/m | 139 | 124 | 123 | 115 | 122 |
| | s.d. | 26 | 14 | 30 | 29 | 13 |
| | | 5C | 5C | 5C | 5C | 5C |
| VICAT | C | 156.5 | 150.1 | 144.6 | 139.2 | 133.4 |
| HDT | C | 141.2 | 134 | 128.6 | 122.1 | 116.8 |
| DSC Tg | C | 147.2 | 139.9 | 134.4 | 130.2 | 123.2 |
| BI RT | J | 143 | 128 | 125 | 114 | 112 |
| | s.d. | 9.7 | 9.8 | 10.7 | 10.2 | 16.5 |
| | | 5D | 5D | 5D | 5D | 5D |
| BI −10 C. | J | 130 | 128 | 139 | 130 | 126 |
| | s.d. | 13.3 | 22.1 | 7.6 | 6.8 | 12.5 |
| | | 5D | 5D | 5D | 5D | 5D |
| BI −30 C. | J | 124 | 115 | 125 | 136 | 115 |
| | s.d. | 8.6 | 10.7 | 14.8 | 19.2 | 15.7 |
| | | 5D | 5D | 5D | 4D/1B | 5D |
| BI −40 C. | J | 113 | 112 | 116 | 112 | 115 |
| | s.d. | 1.9 | 7.7 | 9 | 3.7 | 9.6 |
| | | 4D | 2D/1B | 4D/1B | 1D/3B | 4D |

As is observed from the data, the thermal properties, (Vicat, HDT, Tg) show a steady downward trend with increasing PEC content while the melt viscosity index shows an almost 4 fold increase! The remainder of the tested properties are essentially the same. Therefore, an admixture with strikingly more processability is obtained while maintaining virtually all the properties of the original polycarbonate.

EXAMPLE 2

The bisphenol-A polycarbonate was extruded at 500° F. and molded at 570° F. The dodecanedioate bisphenol-A copolyestercarbonate was extruded at 500° F. and molded at 570° F. The blend was extruded at 500° F. and molded at 570° F.

As shown by the data in Table II, the addition of a lower I.V. polycarbonate to a higher I.V. copolyestercarbonate brings up the melt flow substantially for easier processing and results in a general titration of properties except for one—tensile elongation (TE). In this single property, the addition of the polycarbonate having a sharply lower TE (63±17) to the copolyestercarbonate having a sharply higher TE (98±2) brought little or no change at the various dilutions of copolyestercarbonate with polycarbonate. Rather the value stayed about the same. This is a highly unexpected result. Additionally the low temperature impact strength of the blended polymer up to at least a 50 weight percent PC content demonstrated exceptional retention of the copolyestercarbonate impact resistance.

TABLE II

| PROPERTY | UNIT | PEC 100 PC 0 | 75 25 | 50 50 | 25 75 | 0 100 |
|---|---|---|---|---|---|---|
| I.V. | | 0.54 | | | | 0.42 |
| Melt Flow (g/10 min) | | 9.3 | 11.9 | 14.5 | 18.8 | 23.3 |
| 3.2 mm NI, RT | j/m | 924 | 854 | 785 | 753 | 710 |
| −20 C. | | 790 | 796 | 705 | 422 | 187 |
| −30 C. | | 849 | 780 | 710 | — | — |
| 6.4 mm NI, RT | j/m | 192 | 144 | 139 | 123 | 128 |
| BI | j | 58 | 63 | 59.3 | 54.2 | 56.9 |
| TY | MPa | 58.6 | 59.3 | 60.7 | 61.4 | 62.9 |
| TB | MPa | 60.7 | 62.8 | 65.5 | 64.9 | 55.2 |
| TE | % | 98 ± 2 | 100 ± 4.4 | 104 ± 4.6 | 100 ± 7.6 | 63 ± 17 |
| YI | | 1.9 | 1.7 | 1.6 | 1.5 | 1.4 |
| % H | | .9 | .9 | .6 | .7 | .6 |
| % T | | 90.8 | 91.0 | 91.0 | 91.0 | 91.0 |

What is claimed:

1. A composition comprising
   (i) about 20 to 80 weight percent of a linear aromatic polycarbonate in admixture with a
   (ii) about 80 to 20 weight percent of a copolyestercarbonate having repeating units of the structure

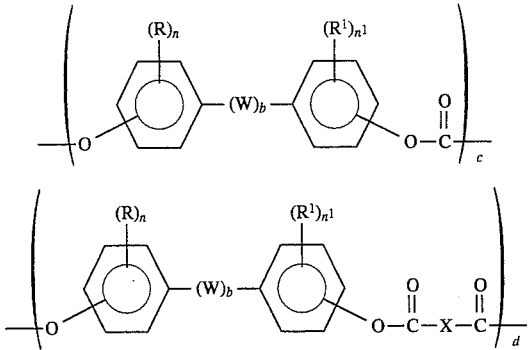

wherein:
R is independently selected from monovalent hydrocarbon and monovalent hydrocarbonoxy radicals;
$R^1$ is independently selected from monovalent hydrocarbon and monovalent hydrocarbonoxy radicals;
W is selected from divalent hydrocarbon radicals,

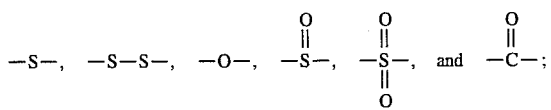

n and $n^1$ are independently selected from integers having a value of from 0 to 4 inclusive;
b is either zero or one;
X is an alkylene group of about 6 to 18 carbon atoms, inclusive;
d is from about 2 to 30 mole percent of the total units
(i) and (ii) are calculated as weight percent of (i)plus (ii) wherein the intrinsic viscosity, measured at 25° C. in methylene chloride in dl/g units, difference between (i) and (ii) is at least 0.04 intrinsic viscosity units whereby the melt Viscosity Index measured at 280° C. and 12 Newtons increases proportionally with the weight percent of copolyestercarbonate but the tensile elongation, measured in percent, is substantially the same for all proportions of copolyestercarbonate and the tensile break, measured in Mpa according to ASTM D638, of the composition is greater than either the copolyester carbonate or polycarbonate alone.

2. The composition of claim 1 wherein (i) is from about 25 to 75 wt. % and (ii) is from about 25 to 75 wt. %.

3. The composition of claim 1 wherein bisphenol-A polycarbonate and bisphenol-A copolyestercarbonate are employed.

4. The composition of claim 1 wherein the intrinsic viscosity difference is about 0.06 intrinsic viscosity units.

5. The composition of claim 4 wherein is a saturated normal alkylene group.

6. The composition of claim 5 wherein X has from eight to ten carbon atoms.

7. The composition claim 6 wherein the mole percent of ester in (ii) is from about 5 to 25 mole percent.

8. The composition of claim 7 wherein (i) is bisphenol-A polycarbonate and (ii) is a bisphenol-A copolyestercarbonate.

9. A composition of claim 1 wherein added polyesters, rubbery materials, polyolefins and impact modifiers known as useful in polycarbonate are essentially absent from the said composition.

10. The composition of claim 1 wherein n is 0 and the aromatic polycarbonate is prepared from bisphenol-A and phosgene.

11. The composition of claim 1 wherein each R and $R^1$ are each independently a monovalent hydrocarbon radical and the aromatic polycarbonate is prepared from a dihydric phenol of the general formula

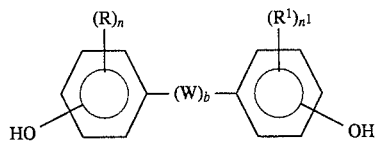

and phosgene or diphenyl carbonate.

12. The composition of claim 1 wherein each R and $R^1$ are each independently a monovalent hydrocarbonoxy radical and the aromatic polycarbonate is prepared from dihydric phenol of the general formula

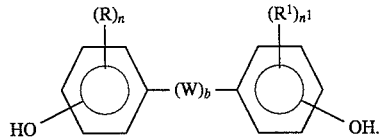

13. The composition of claim 1 wherein each R is independently a monovalent hydrocarbon radical and each $R^1$ is independently a monovalent hydrocarbonoxy radical and the aromatic polycarbonate is prepared from a dihydric phenol of the general formula

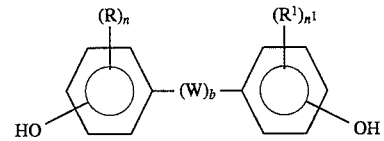

and phosgene or diphenyl carbonate.

14. The composition of claim 1 wherein each R and $R^1$ are each independently selected from the group consisting of monovalent hydrocarbon radicals and monovalent hydrocarbonoxy radicals and the aromatic polycarbonate is prepared from a dihydric phenol of the general formula

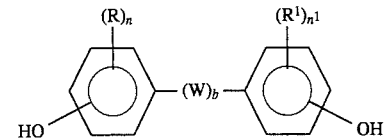

and phosgene or diphenyl carbonate.

* * * * *